(12) United States Patent
Chen et al.

(10) Patent No.: US 7,688,485 B2
(45) Date of Patent: Mar. 30, 2010

(54) MULTI-FUNCTION PERIPHERAL WITH REPLACEABLE INK CARTRIDGE AND ASSOCIATED SYSTEMS AND METHODS

(76) Inventors: Ching-Hui Chen, 15-1F, No. 1, Lane 47, Sec. 3, An-He Rd., Hsin-Tien City, Taipei (TW); Min Chao, No. 1, Alley 7, Lane 201, Kangle St., Neikou Li, Neihu Dist., Taipei (TW)

( * ) Notice: Subject to any disclaimer, the term of this patent is extended or adjusted under 35 U.S.C. 154(b) by 1294 days.

(21) Appl. No.: 10/699,660

(22) Filed: Nov. 4, 2003

(65) Prior Publication Data
US 2004/0196512 A1 Oct. 7, 2004

(30) Foreign Application Priority Data
Apr. 1, 2003 (TW) ............................. 92205107 U

(51) Int. Cl.
*H04N 1/46* (2006.01)
(52) U.S. Cl. ...................... 358/502; 358/505
(58) Field of Classification Search ............. 358/497, 358/496, 498; 355/39; D18/50; 347/108
See application file for complete search history.

(56) References Cited
U.S. PATENT DOCUMENTS
4,367,947 A * 1/1983 Arter et al. .................... 355/75

| 5,774,141 | A | * | 6/1998 | Cooper et al. | 347/34 |
| 5,909,226 | A | * | 6/1999 | Takeda | 347/3 |
| 6,151,140 | A | * | 11/2000 | Wilcox et al. | 358/498 |
| 6,381,377 | B1 | * | 4/2002 | Wang | 382/299 |
| 6,634,746 | B2 | * | 10/2003 | Kawakami | 347/108 |
| 6,923,584 | B2 | * | 8/2005 | Namekawa et al. | 400/625 |
| 2003/0184627 | A1 | * | 10/2003 | Sasaki et al. | 347/86 |
| 2003/0184771 | A1 | * | 10/2003 | Yamamoto et al. | 358/1.7 |
| 2004/0252330 | A1 | * | 12/2004 | Brown et al. | 358/1.15 |
| 2005/0099660 | A1 | * | 5/2005 | Yada et al. | 358/498 |
| 2005/0151782 | A1 | * | 7/2005 | Ishida et al. | 347/37 |

* cited by examiner

*Primary Examiner*—Douglas Q Tran
(74) *Attorney, Agent, or Firm*—Perkins Coie LLP

(57) ABSTRACT

A multi-function peripheral mainly includes a casing, a scanning module and an inkjet printing module. The scanning module is located on the top side of the casing, including a scan platform and a dynamic scanning unit for capturing image data. The inkjet printing module is located below the scan platform and includes a dynamic printing unit for moving an ink cartridge to perform printing operations. The moving path of the ink cartridge is substantially normal to the longitudinal axis of the scan platform. When the ink cartridge is moved to a cartridge replacing position located on a distal end of the dynamic printing unit, it escapes from under the scan platform to facilitate cartridge replacement operations.

24 Claims, 4 Drawing Sheets

MULTI-FUNCTION PERIPHERAL WITH REPLACEABLE INK CARTRIDGE AND ASSOCIATED SYSTEMS AND METHODS

FIELD OF THE INVENTION

The invention relates to business machines and particularly to business machines that integrate multiple functions such as copying, printing, facsimile and scanning, and have a novel space design to facilitate replacement of the ink cartridge.

BACKGROUND OF THE INVENTION

Miniaturization and function integration have become prevailing trends for information apparatus nowadays. This integration trend has also affected business machines used in the office environment such as printers, copiers, FAX machines, scanners, and the like. They are gradually being combined to become Multi-Function Peripherals (MFP) that provide multiple functions to perform the tasks of copying, printing, facsimile and scanning.

The structure and functional integration of the MFP not only aims at combining and rearranging the physical elements, under the requirement of miniaturization, to combine and simplify similar functions also becomes necessary. For instance, the control chips that once controlled single functional modules of copying, printing, facsimile and scanning are now being expanded to simultaneously cover the CPU module, printing control module, scanning control module, Facsimile compression and decompression module, image compression and decompression module, memory control module, and even the LCD panel control module. The advance of technology has significant impact on this functional integration.

On the rearrangement of physical structure, the present MFPs on the market, especially the models that combine flat-top scanning modules and inkjet printing modules, mostly have the scanning module located above the printing module. The scanning module occupies a rectangular space (larger than a sheet of A4 paper). It is partly overlapped with the paper exit chute located below the printing module (or paper feeding cartridge) to reduce the size of the whole device.

The overlapping arrangement mentioned above usually is accomplished by having the longitudinal axis of the scan platform substantially parallel with the moving path of the ink cartridge of the inkjet printing module to form a cross configuration. Namely, the longitudinal axis of the scan platform is substantially normal to the paper conveying path of the casing. The entire moving path of the inkjet printing module is covered by the scan platform. Practical examples can be found in the All-in-One series products of HP Co., including product models PSC 750, PSC 950, PSC 2110 and PSC 2210; MULTIPASS series products of CANON Co., including F20, F30, F60 and F80; models X73, X75, X83, X85 and X5150 of LEXMARK Co.; or model MF C950 of BROTHER Co. However, such a configuration layout creates problems for ink cartridge replacement in actual use, notably:

1. The interior space is wasted and the size of the complete device increases. Take model X83 of LEXMARK Co. for example. It has an upright paper feeding chute on the back side of the casing. The paper exit chute has an L-shaped paper conveying path. As there is no paper feeding cartridge below the paper exit chute, theoretically, the overall height of the device can be reduced. However, in fact this is not the case. This is caused by the design of the ink cartridge replacement function. The case lid at the front side has to be opened to allow a user's hand to access the interior of the device to remove the ink cartridge. As one's hand has to operate in a closed casing, a sufficient space should be allocated for such a purpose. Naturally, waste of space occurs.
2. Replacement of the ink cartridge is difficult. Take the same model X83 of LEXMARK Co. as an example. The user's vision is blocked by his or her hand during ink cartridge replacement operations. Thus operation accuracy suffers. This problem also occurs in other types of ink cartridge replacement designs such as with model PSC 950 of HP Co. It that model, the entire scan platform must be lifted toward the back side of the machine. As almost all of the elements of the entire scanning module are located on the scan platform, the platform is quite large and heavy. The lifting operation is thus inconvenient.

SUMMARY OF THE INVENTION

The primary object of the invention is therefore to resolve the disadvantages occurring with the conventional MFPs such as waste of interior space, bulky size and difficulty in replacement of the ink cartridge.

In order to achieve the foregoing object, the MFP of the invention mainly includes a casing, a scanning module located on the top side of the casing that has a scan platform and a dynamic scanning unit for capturing image data, and an inkjet printing module located below the scan platform that has a dynamic printing unit to drive an ink cartridge to move and process printing operations. The moving path of the ink cartridge is substantially normal to the longitudinal axis of the scan platform, and when the ink cartridge is moved to the replacing position at one end of the dynamic printing unit, it moves away from under the scan platform.

The invention provides a novel space arrangement to allow replacement of the ink cartridge to be more convenient.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
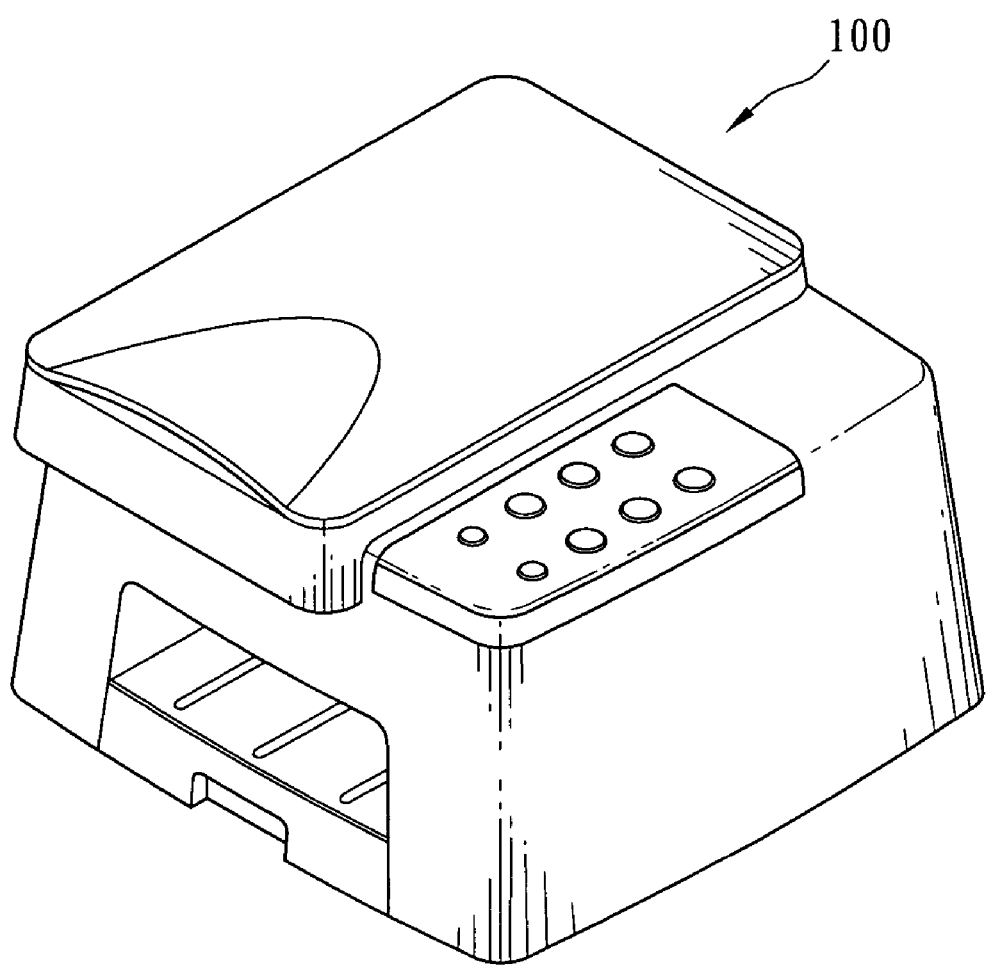
FIG. 1 is a perspective view of a preferred embodiment of the invention.
Figure 2:
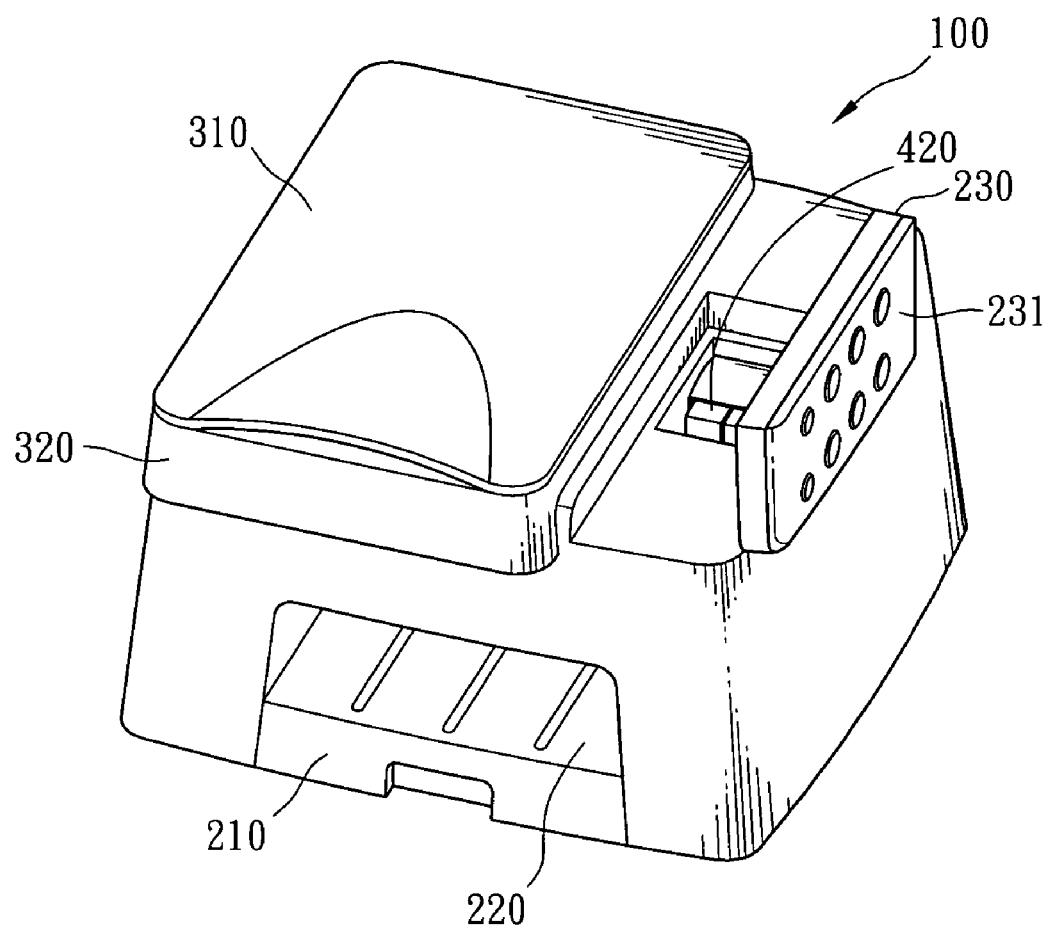
FIG. 2 is a perspective view of a preferred embodiment of the invention, with the cartridge lid opened to expose the ink cartridge.
Figure 3:
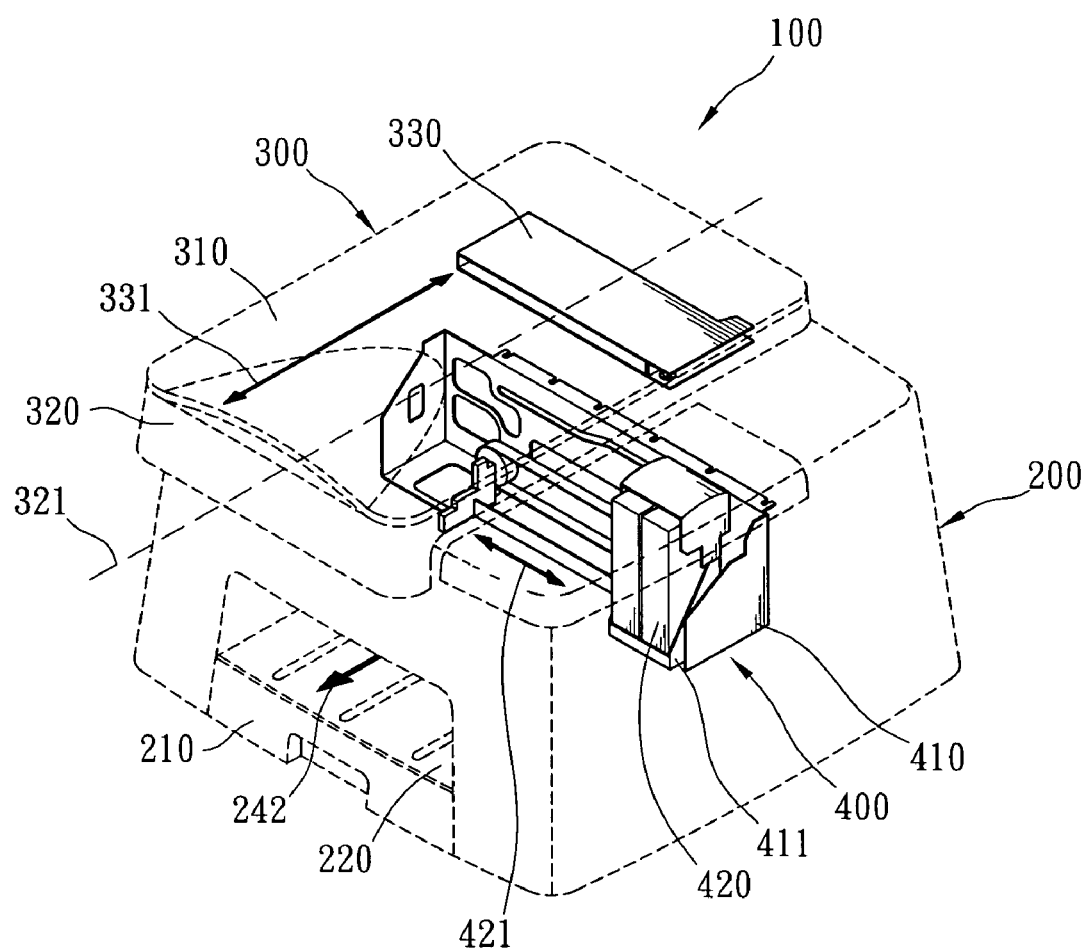
FIG. 3 is a schematic view of a preferred embodiment of the invention in an operating condition, showing the positions of the scanning module and the inkjet printing module and their operating methods.

Referring to FIGS. 1 through 4, the MFP 100 according to the invention mainly includes a casing 200, a scanning module 300 and an inkjet printing module 400. The MFP 100 integrates functions of copying, printing, facsimile and scanning. To simplify explanation, in the embodiment below the facsimile function is omitted, and the drawings also are simplified. Structural details and relationships of the MFP 100 are elaborated as follows:

The casing 200 includes an outer shell and inner support structures. At the lower side in the center (referring to FIG. 3 for the directions), there is a paper feeding cartridge 210. Above the paper feeding cartridge 210, there is a rectangular paper exit chute 220 which has an opening directed forwards. On one side of the top surface of the casing 200, there is a cartridge lid 230 which may be lifted and opened. There is a control panel 231 located on the top side of the cartridge lid 230. The location below the cartridge lid 230 is reserved for cartridge replacement.

The scanning module 300 is located on the left side of the top section of the casing 200 adjacent to the cartridge lid 230. It has a top lid 310, a scan platform 320 and a movable dynamic scan module 330 located in the scan platform 320 for capturing image data. The scan platform 320 and the top lid 310 are rectangular and of a size slightly larger than a sheet of A4 paper. The scan platform 320 has a longitudinal axis 321, which is positioned from the front side to the rear side in FIG. 3. The dynamic scanning module 330 has a scanning path 331 substantially parallel with the longitudinal axis 321 of the scan platform 320.

The inkjet printing module 400 is located on an upper section of one end of the paper feeding cartridge 210 in the casing 200 and below the scan platform 320. It includes a dynamic printing unit 410 and an ink cartridge 420. The dynamic printing unit 410 has driving power and a cartridge bracket 411 to hold the ink cartridge 420 and move the ink cartridge 420 to perform printing operations. The moving path 421 of the ink cartridge 420 is to the left and right in FIG. 3, i.e. substantially normal to the longitudinal axis 321 of the scan platform 320. The dynamic printing module 410 has a distal end on the right side extending under the cartridge lid 230 (referring to FIG. 3), and escaping from the bottom side of the scan platform 320. Thus the length of the moving path 421 of the ink cartridge 420 is greater than the width of the shorter axis of the scan platform 320.

Figure 4:
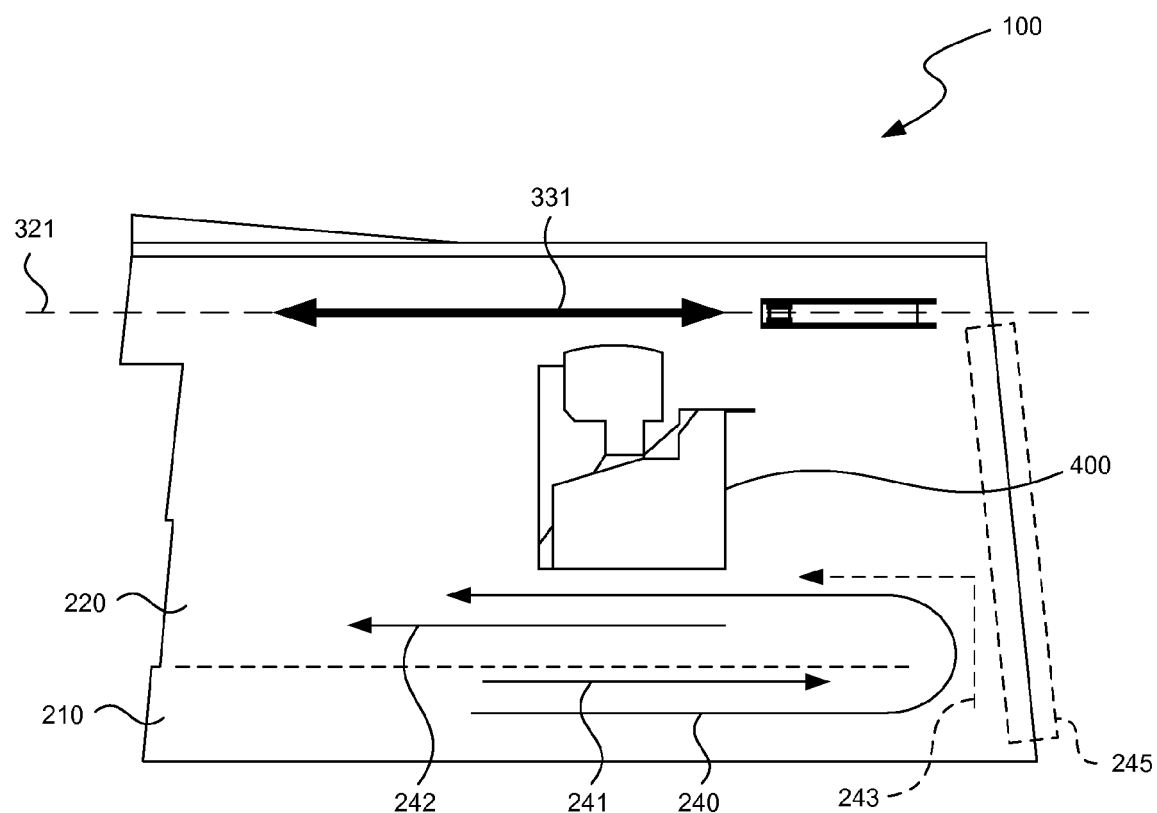
FIG. 4 is a schematic view of a preferred embodiment of the invention in an operating condition, showing the entire paper conveying path including the paper feeding path and paper discharge path.

The casing 200 includes a paper conveying path 240 (referring to FIG. 4). Paper is fed from the bottom end of the paper feeding cartridge 210, then is moved upwards and forwards and turned back to be printed by the inkjet printing module 400. Finally, it reaches the paper exit chute 220 located above the paper feeding cartridge 210. The entire paper conveying path 240 is formed in a C-shape (or U-shape). Furthermore, with the inkjet printing module 400 serving as the boundary, the front half section of the paper conveying path 240 is the paper feeding path 241, while the rear half of the paper conveying path 240 is the paper discharge path 242. In the space configuration of the invention, the paper discharge path 242 and the longitudinal axis 321 of the scan platform 320 are substantially parallel with each other (referring to FIGS. 3 and 4).

According to the configuration of the various modules of this embodiment of the invention, for replacing the ink cartridge 420, the ink cartridge 420 is moved to a cartridge replacing position located on a distal end of the right side of the dynamic printing module 410, and completely moved away from under the scan platform 320. Thus when the cartridge lid 230 is opened, the ink cartridge is exposed to make replacement easier.

The space arrangement and configuration set forth above is more convenient than the conventional methods that reserve an interior space to accommodate a human hand to access and replace the ink cartridge, or the design that requires lifting the entire scan platform to replace the ink cartridge.

It is to be noted that the C-shaped paper conveying path disclosed in the embodiment also may be adapted in a casing that has an L-shaped paper conveying path 243 (shown in broken lines). The paper discharge path in the rear half section is the same as the embodiments set forth above. The paper feeding path ranges from a paper feeding chute 245 (shown schematically in broken lines) located on the backside of the casing to the inkjet printing module. Thus any machine type that has a paper discharge path substantially parallel with the longitudinal axis of the scan platform can adopt the configuration of the invention.

In addition, taking into account the installation of control circuits, the control panel may be installed on any desired location other than the cartridge lid, such as the spare area located on the right and back side of the top surface of the casing. The cartridge lid may also be located on a selected position other than the top side of the casing, such as on a lateral side of the casing, as long as the position of the ink cartridge is exposed when opened to facilitate replacement of the ink cartridge.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multi-function peripheral, comprising:
 a casing having an exterior surface with a first region laterally adjacent to a second region, wherein the casing comprises a scanner lid positioned in the first region and movable between an open position and a closed position, and a cartridge lid positioned in the second region outside of a periphery of the first region;
 a scanning module disposed within the casing and including a scan platform and a scanning unit for capturing image data, the scan platform having a scan footprint defined, at least in part, by a first axis having a first dimension and a second axis having a second dimension, the second axis being generally perpendicular to the first axis, and the second dimension being shorter than the first dimension; and
 a printing module disposed within the casing below the scan platform, the printing module having a printing unit including a cartridge bracket for carrying at least one ink cartridge, the printing module being configured to move the cartridge bracket along an axis of movement that is generally parallel with the second axis of the scanning platform but longer than the second axis, the printing module being further configured to carry the cartridge bracket to a cartridge replacement position outside of the scan footprint, wherein the ink cartridge is accessible when the cartridge bracket is in the replacement position and the scanner lid remains in the closed position.

2. The multi-function peripheral of claim 1 wherein the casing has a paper conveying path that comprises a paper feeding path and a paper discharge path, the paper discharge path being generally parallel with the first axis of the scan platform.

3. The multi-function peripheral of claim 2 wherein the paper conveying path has a C-shape.

4. The multi-function peripheral of claim 2 wherein the paper conveying path has an L-shape.

5. The multi-function peripheral of claim 2 wherein the paper feeding path extends between a paper feeding cartridge located below the scan platform and the printing module, and the paper discharge path extends between the printing module and a paper exit chute located between the scan platform and the paper feeding cartridge.

6. The multi-function peripheral of claim 2 wherein the paper feeding path extends between a paper feeding chute located on a backside of the casing to the printing module, and the paper discharge path extends between the printing module to a paper exit chute located below the scan platform.

7. The multi-function peripheral of claim 1 wherein the cartridge lid is laterally adjacent to the scanner lid in a side-by-side configuration.

8. The multi-function peripheral of claim 7 wherein the cartridge lid has a control panel thereon.

9. The multi-function peripheral of claim 1 wherein the scanning unit has a scanning path generally parallel with the first axis of the scan platform.

10. The multi-function peripheral of claim 7 wherein the cartridge lid is generally coplanar with the scan platform.

11. The multi-function peripheral of claim 1 wherein the at least one ink cartridge comprises an inkjet printer cartridge.

12. A consumer electronic device, comprising:
 a housing having an exterior surface with a first region laterally adjacent to a second region;
 a printer having a paper feeding unit with a first longitudinal axis and a carriage bracket for carrying a printer cartridge along a first transverse axis that is perpendicular with the first longitudinal axis, and a cartridge lid positioned in the first region; and
 a scanner operably coupled to the printer, the scanner including a scanner lid positioned in the second region outside of a periphery of the first region, wherein the scanner lid is movable between an open position and a closed position, and a scan platform having a footprint defined by a second longitudinal axis and a second transverse axis, the second longitudinal axis aligned with the first longitudinal axis of the paper feeding unit and the second transverse axis perpendicular with the longitudinal axis of the scan platform;
 wherein the carriage bracket is configured to carry the printer cartridge along the first transverse axis of the printer to a position that is outside of the footprint of the scanner, wherein the printer cartridge is accessible in the position outside the footprint of the scanner when the scanner lid remains in the closed position.

13. The consumer electronic device of claim 12 wherein the printer is generally below the scanner, and the paper feeding unit comprises a generally C-type shape.

14. The consumer electronic device of claim 12 wherein the printer is generally below the scanner, and the paper feeding unit comprises generally L-type shape.

15. An electronic device, comprising:
 a scanning module including a scanner lid moveable between an open position and a closed position, a scan platform, and scanning means for acquiring image data regarding an object positioned at the scan platform, the scan platform having a generally rectangular footprint that comprises a longitudinal dimension and a lateral dimension that is shorter than the longitudinal dimension;
 a printing module operably coupled to the scan platform and including a cartridge lid and printing means employing a printer cartridge for printing a graphical image associated with the object, the printing means carrying the printer cartridge along an axis of motion that is generally parallel with the lateral dimension of the rectangular footprint, the printing means also carrying the printer cartridge to a cartridge replacement position outside of the rectangular footprint of the scan platform, wherein the printer cartridge is accessible in the replacement position when the scanner lid remains in the closed position; and
 means for commonly housing the scanning module and the printing module, wherein the means for commonly housing comprises an exterior surface having a first region at least generally coplanar with a second region, and wherein the scanner lid is positioned in the first region and the cartridge lid is positioned in the second region outside of a periphery of the first region.

16. The electronic device of claim 15, further comprising paper conveying means operably coupled with the printing module, the paper conveying means including a paper feeding path and paper discharge path.

17. The multi-function peripheral of claim 16 wherein the paper feeding path extends between a paper feeding cartridge located below the scanning module and the printing module, and the paper discharge path extends between the printing module and a paper exit chute located between the scanning module and the paper feeding cartridge.

18. The multi-function peripheral of claim 16 wherein the paper feeding path extends between a paper feeding chute located on a backside of the means for commonly housing the scanning module and the printing module, and the paper discharge path extends between the printing module to a paper exit chute located below the scan module.

19. The multi-function peripheral of claim 16 wherein the paper conveying means has a C-shape.

20. The multi-function peripheral of claim 16 wherein the paper conveying means has an L-shape.

21. A multi-function peripheral, comprising:
 a housing having an exterior surface with a first region adjacent to a second region in a side-by-side configuration;
 a scanning module carried by the housing, wherein the scanning module comprises a scanning footprint and a scanning lid that is positioned in the first region and movable between a closed position and an open position; and
 a printing module movable within the housing, wherein the printing module carries an ink cartridge and is configured to move the ink cartridge to a replacement position outside of the scanning footprint, wherein the ink cartridge is accessible in the replacement position when the scanning lid remains in the closed position, and wherein the printing module further comprises a cartridge lid positioned in the second region outside of a periphery of the first region.

22. The multi-function peripheral of claim 21, further comprising a control panel on the cartridge lid, wherein the cartridge lid is movable from a closed position to an open position to expose the ink cartridge through an opening in the housing when the ink cartridge is in the replacement position.

23. The multi-function peripheral of claim 21 wherein the housing comprises an opening aligned with the replacement position, and wherein the ink cartridge is capable of being exposed through the opening when the ink cartridge is in the replacement position.

24. The multi-function peripheral of claim 23 wherein the cartridge lid is independently movable from the scanning lid, and wherein the cartridge lid covers the opening when the cartridge lid is in a closed position.

* * * * *